United States Patent
Gresser et al.

(10) Patent No.: US 10,214,143 B2
(45) Date of Patent: Feb. 26, 2019

(54) METHOD FOR ASSISTING A MOTOR VEHICLE DRIVER WHEN DRIVING THROUGH A NARROW PASSAGE AND/OR FOR MAINTAINING A SAFE DISTANCE FROM A VEHICLE IN FRONT

(75) Inventors: Klaus Gresser, Dachau (DE); Manfred Geischeder, Traunstein (DE); Thorsten Tronnier, Erdweg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1334 days.

(21) Appl. No.: 12/638,397

(22) Filed: Dec. 15, 2009

(65) Prior Publication Data
US 2010/0094541 A1    Apr. 15, 2010

Related U.S. Application Data
(63) Continuation of application No. PCT/EP2008/004258, filed on May 29, 2008.

(30) Foreign Application Priority Data
Jun. 16, 2007 (DE) .......... 10 2007 027 756

(51) Int. Cl.
| | | |
|---|---|---|
| G06F 19/00 | (2018.01) |
| G01C 21/36 | (2006.01) |
| H04N 7/18 | (2006.01) |
| B60Q 1/50 | (2006.01) |
| B62D 15/02 | (2006.01) |

(52) U.S. Cl.
CPC .......... *B60Q 1/50* (2013.01); *B62D 15/0295* (2013.01); *B60Q 2400/50* (2013.01)

(58) Field of Classification Search
CPC . B60Q 1/28; B60Q 1/34; B60Q 1/346; B60Q 2400/50; B62D 15/0295
USPC .................. 701/201, 300; 348/149, E07.085
See application file for complete search history.

(56) References Cited

U.S. PATENT DOCUMENTS

| 5,467,283 A | 11/1995 | Butsuen et al. |
| 5,530,420 A | 6/1996 | Tsuchiya et al. |
| 5,874,905 A * | 2/1999 | Nanba et al. .............. 340/995.2 |

(Continued)

FOREIGN PATENT DOCUMENTS

| DE | 590 399 | 1/1934 |
| DE | 44 46 452 A1 | 6/1995 |

(Continued)

OTHER PUBLICATIONS

German Search Report dated Nov. 6, 2007 including partial English translation (Nine (9) pages).

(Continued)

*Primary Examiner* — Mussa A Shaawat
*Assistant Examiner* — Kyung J Kim
(74) *Attorney, Agent, or Firm* — Crowell & Moring LLP

(57) ABSTRACT

A method for supporting a driver of a motor vehicle when driving the motor vehicle through a narrow passage. In order to provide a cost-effective method, the anticipated vehicle path to be covered next is displayed to the driver. The width of the vehicle path shown corresponds to the actual width of the vehicle. If the length of the vehicle path display is realized in a speed-dependent fashion, information regarding the distance from the preceding vehicle arises as a further advantage.

18 Claims, 2 Drawing Sheets

(56) References Cited

U.S. PATENT DOCUMENTS

| | | | |
|---|---|---|---|
| 6,564,130 B2* | 5/2003 | Shimazaki et al. | 701/41 |
| 2001/0028393 A1* | 10/2001 | Tomida et al. | 348/207 |
| 2003/0147247 A1* | 8/2003 | Koike | 362/464 |
| 2004/0257442 A1 | 12/2004 | Eggers et al. | |
| 2005/0031169 A1* | 2/2005 | Shulman et al. | 382/104 |
| 2005/0125121 A1 | 6/2005 | Isaji et al. | |
| 2006/0022811 A1 | 2/2006 | Haug | |
| 2006/0087416 A1 | 4/2006 | Kumabe et al. | |
| 2010/0017111 A1* | 1/2010 | Stefani | 701/201 |

FOREIGN PATENT DOCUMENTS

| | | |
|---|---|---|
| DE | 197 38 764 A1 | 3/1999 |
| DE | 102 03 413 C2 | 8/2003 |
| DE | 10 2004 057 188 A1 | 6/2005 |
| DE | 10 2004 048 347 A1 | 4/2006 |
| DE | 20 2006 012 548 U1 | 2/2007 |
| DE | 43 35 801 B4 | 4/2007 |
| EP | 1 334 869 A2 | 8/2003 |
| EP | 1 621 403 A1 | 2/2006 |
| JP | 2000-78414 A | 3/2000 |

OTHER PUBLICATIONS

International Search Report dated Aug. 28, 2008 including English translation (Six (6) pages).

\* cited by examiner

METHOD FOR ASSISTING A MOTOR VEHICLE DRIVER WHEN DRIVING THROUGH A NARROW PASSAGE AND/OR FOR MAINTAINING A SAFE DISTANCE FROM A VEHICLE IN FRONT

CROSS REFERENCE TO RELATED APPLICATIONS

This application is a continuation of PCT International Application No. PCT/EP2008/004258, filed May 29, 2008, which claims priority under 35 U.S.C. § 119 to German Patent Application No. 10 2007 027 756.5, filed Jun. 16, 2007, the entire disclosures of which are herein expressly incorporated by reference.

BACKGROUND AND SUMMARY OF THE INVENTION

The invention relates to a method for assisting a driver of a motor vehicle when the motor vehicle is driven through a narrow passage.

Driving through narrow passages, such as construction sites on expressways, will lead to a feeling by the driver of uncertainty in some cases. This often results in a situation where passing maneuvers of wide vehicles are not carried out by the driver, and therefore slow vehicles may be followed over a distance of many kilometers. It is sometimes difficult for a driver to assess whether his own vehicle will "fit" through a narrow passage without laterally striking against, for example, a construction site boundary or other vehicles. Uncertainty with respect to driving through narrow passages also occurs in cities, for example, when driving through multi-cornered city streets, parked vehicles, etc.

It is an object of the present invention to provide a method for assisting a driver of a motor vehicle, which can be carried out in a cost-effective manner, when the motor vehicle is driving through a narrow passage.

This object is achieved by a method for assisting a driver of a motor vehicle when the motor vehicle is driven through a narrow passage and/or for maintaining a safety distance from a vehicle in front. The method displays the driving path that is anticipated to be covered next by the vehicle to the driver of the vehicle wherein the width of the displayed driving path corresponds to the actual width of the vehicle. Advantageous embodiments of the invention are further disclosed herein.

DETAILED DESCRIPTION OF THE DRAWINGS

Figure 1:
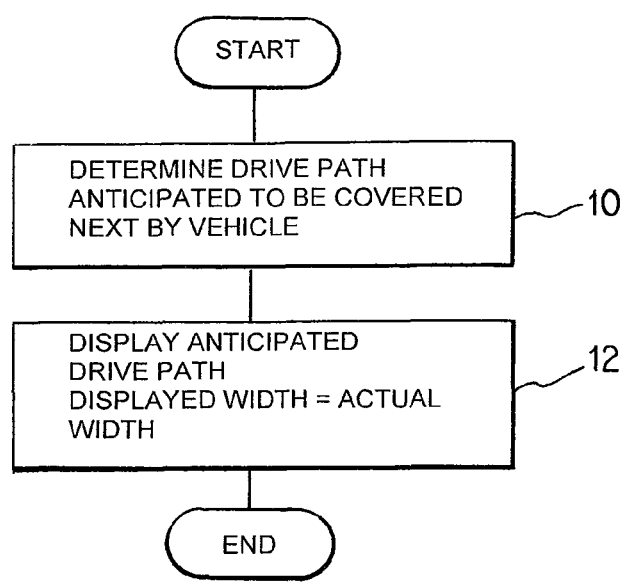
FIG. 1 is a flow chart illustrating the method for assisting a driver of a motor vehicle in accordance with an exemplary embodiment of the present invention.

Referring to FIG. 1, there is shown an exemplary embodiment of the method according to the invention, which method assists a driver of a motor vehicle when the motor vehicle is driving through a narrow passage. The method determines a drive path that is anticipated to be covered next by the vehicle (step 10). That drive path is displayed to the driver of the vehicle (step 12). In this case, the width of the displayed vehicle path corresponds to the actual width of the vehicle (step 12).

Figure 2:
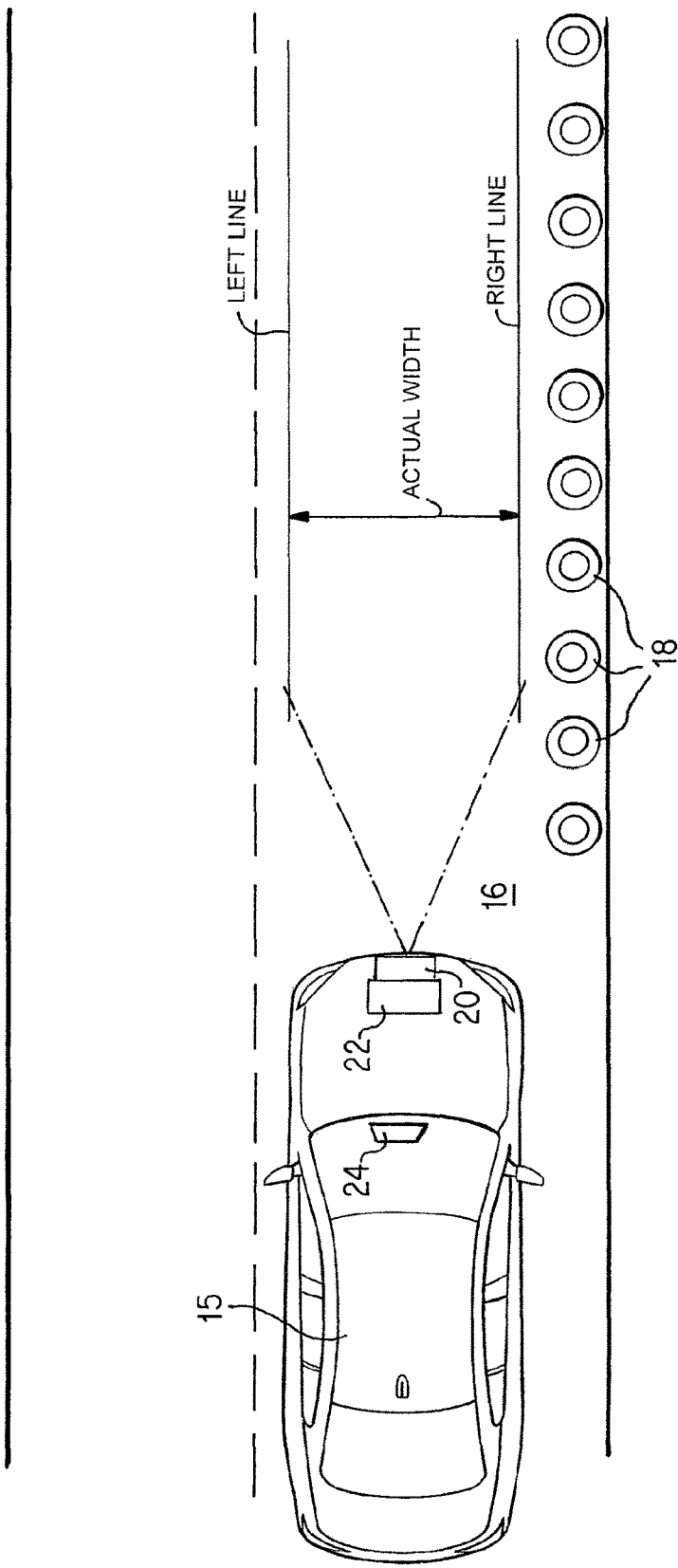
FIG. 2 is a simplified diagram illustrating an exemplary embodiment of the method according to the present invention.

In an embodiment as shown in FIG. 2, it is provided that a camera 20 directed forwardly with respect to the vehicle 15 provides image sequences (e.g., video images) of the road 16 on which the vehicle is driving. These are preferably shown to the driver on a display or a heads-up display (24), and the probable drive or vehicle path is faded into these image sequences. This preferably takes place by using lines for the left and right edges of the drive path or by use of an area bounded by lines.

In one embodiment, the yaw rate of the vehicle is measured and the probable drive or vehicle path is precomputed by using a vehicle model. This drive path is recomputed into the coordinate system of the camera and is combined with the image shown in the display.

In the case of another embodiment or further development, it is provided that the probable drive path is projected onto the road 16 on which the vehicle 15 is driving by way of a projection device 22 arranged in the vehicle, preferably by using lines for the left and the right edge of the traveling path or an area bounded by lines. As a result, the driver can determine even faster whether he can pass through the narrow passage (which may be due to construction activity if, for example) regardless, and the driver's attention will not be diverted from the traffic situation.

In the case of yet another embodiment, it is provided that the drive path that is anticipated to be covered next by the vehicle is determined by a detection of the steering angle of the vehicle alone or in combination with the measured yaw rate.

As an alternative or in addition, it is provided in a further embodiment that the drive path that is anticipated to be covered next by the vehicle is indicated by a navigation system existing in the vehicle. The navigation system determines the current position of the vehicle by using GPS or similar signals. The intended travel destination of the vehicle has been fed into the navigation system, and the navigation system determines a suitable travel route for which the drive path that is anticipated to be covered next will always be indicated in an up-to-date fashion.

In another embodiment, it is provided that the length of the probable drive path displayed to the driver will increase with an increasing speed of the vehicle. At higher speeds, the driver is thereby given sufficiently early the opportunity to recognize whether or not he can pass through the narrow passage.

In a further development, it is provided that the length of the probable drive path displayed to the driver corresponds to a time interval of several seconds of driving time, preferably approximately 1 to 3 seconds, especially 2 seconds. If the length of the displayed drive path is designed to be a function of the vehicle speed, information concerning the distance from the front vehicle is obtained as a further advantage. When the front vehicle and the marked area or the marked drive path overlap, the driver is preferably provided with the information that there has been a falling below a minimum distance defined by him or predetermined, particularly a legally minimum distance prescribed by law.

In the case of yet another embodiment, it is provided that the length of the probable drive path shown to the driver is within a range of approximately 10 to 300 meters. In another embodiment of the invention, it is provided that the length of the probable drive path displayed to the driver extends to the horizon. These are additional measures for informing the driver sufficiently early as to whether his vehicle can pass through a narrow passage ahead.

In another embodiment, it is provided that the driver can activate the described functionalities by the push of a button precisely in those situations in which he wants assistance.

As an alternative or in addition, it is provided in another embodiment of the invention that the functionalities are activated depending on the current driving situation. The information required for this purpose can be supplied by up-to-date traffic reports concerning narrow passages or bottlenecks on the travel route as well as by way of narrow passage or bottleneck sensors on the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assisting a driver of a motor vehicle when driving through a narrow passage, the method comprising the acts of:
    determining a drive path that is anticipated to be covered next by the motor vehicle;
    projecting the anticipated drive path onto a road on which the vehicle is driving via a projection device arranged in the vehicle, wherein the projected anticipated drive path is visible to the driver and wherein a width of the projected anticipated drive path corresponds to an actual width of the motor vehicle, wherein a length of the anticipated drive path increases with an increasing speed of the motor vehicle; and
    notifying the driver when a distance between a front vehicle and the projected anticipated drive path is below a predetermined value, and whether the vehicle can pass through a narrow passage ahead based on the projected anticipated drive path.

2. The method according to claim 1, wherein the displaying act further comprises the acts of:
    using a camera directed forward with respect to the motor vehicle to provide image sequences of a road on which the motor vehicle is driving; and
    combining the anticipated drive path in the image sequences.

3. The method according to claim 2, wherein the anticipated drive path is represented by one of:
    lines identifying left and right edges of the drive path, and
    an area bounded by lines.

4. The method according to claim 3, wherein the image sequences are displayed on one of a dashboard display and a heads-up display.

5. The method according to claim 1, wherein the act of projecting the anticipated drive path is carried out by projecting one of lines representing left and right edges of the drive path and an area bounded by lines.

6. The method according to claim 1, wherein the act of determining the anticipated drive path is carried out by at least one of:
    detecting a steering angle of the motor vehicle;
    detecting a yaw rate of the motor vehicle; and
    detecting a steering angle rate of the motor vehicle.

7. The method according to claim 1, wherein the anticipated drive path of the motor vehicle is indicated by a vehicle navigation system that determines a current position of the motor vehicle, wherein an intended travel destination the motor vehicle is fed into the vehicle navigation system and the vehicle navigation system determines a suitable travel route for which the anticipated drive path will be always indicated in an up-to-date fashion.

8. The method according to claim 1, wherein a length of the anticipated drive path displayed to the driver corresponds to a time interval of one or more seconds of drive time.

9. The method according to claim 8, wherein the time interval is approximately 1 to 3 seconds.

10. The method according to claim 1, wherein a length of the anticipated drive path displayed to the driver is within a range of approximately 10 to 300 meters.

11. The method according to claim 1, wherein a length of the anticipated drive path displayed to the driver extends to a horizon of the display.

12. The method according to claim 1, further comprising the act of selecting the width of the anticipated drive path to be displayed to the driver to be at least one safety value greater than the actual width of the motor vehicle.

13. The method according to claim 1, further comprising the act of receiving a key press indicative signal to activate the method.

14. The method according to claim 1, further comprising activating said projecting of the anticipated drive path in response to at least one of a traffic report related to bottlenecks on the travel route and vehicle sensor signals indicative of a bottleneck on the travel route.

15. A method for assisting a driver of a motor vehicle when driving through a narrow passage, the method comprising the acts of:
    determining a drive path that is anticipated to be covered next by the motor vehicle;
    displaying the anticipated drive path;
    projecting the anticipated drive path onto a road on which the vehicle is driving via a projection device arranged in the vehicle, wherein the projected anticipated drive path is visible to the driver and wherein a width of the projected anticipated drive path corresponds to an actual width of the motor vehicle; and
    notifying the driver when a distance between a front vehicle and the projected anticipated drive path is below a predetermined value, and whether the vehicle can pass through a narrow passage ahead based on the projected anticipated drive path.

16. The method of claim 1, wherein the drive path is disposed at a front of the motor vehicle and corresponds to a road on which the motor vehicle is driving.

17. The method of claim 15, wherein the drive path is disposed at a front of the motor vehicle and corresponds to a road on which the motor vehicle is driving.

18. The method according to claim 15, further comprising activating said projecting of the anticipated drive path in response to at least one of a traffic report related to bottlenecks on the travel route and vehicle sensor signals indicative of a bottleneck on the travel route.

* * * * *